(12) United States Patent
Greenfield

(10) Patent No.: US 7,265,292 B2
(45) Date of Patent: Sep. 4, 2007

(54) WEATHERPROOF WHILE-IN-USE ELECTRICAL RECEPTACLE COVER ASSEMBLY

(76) Inventor: Peter Greenfield, 99 Doxsee Dr., Freeport, NY (US) 11520

( * ) Notice: Subject to any disclaimer, the term of this patent is extended or adjusted under 35 U.S.C. 154(b) by 0 days.

(21) Appl. No.: 11/201,436

(22) Filed: Aug. 10, 2005

(65) Prior Publication Data

US 2006/0231282 A1 Oct. 19, 2006

Related U.S. Application Data

(63) Continuation-in-part of application No. 29/228,035, filed on Apr. 18, 2005, and a continuation-in-part of application No. 29/228,034, filed on Apr. 18, 2005.

(51) Int. Cl.
*H02G 3/14* (2006.01)

(52) U.S. Cl. ............................ 174/67; 174/66; 174/50; 174/53; 220/3.8; 220/241; 220/242

(58) Field of Classification Search .................. 174/48, 174/50, 53, 58, 57, 66, 67, 480, 481; 220/3.2, 220/3.3, 3.4, 3.5, 3.6, 3.7, 3.8, 4.02, 241, 220/242; 248/906; D13/152, 156, 177
See application file for complete search history.

(56) References Cited

U.S. PATENT DOCUMENTS

| | | | | |
|---|---|---|---|---|
| 3,686,425 A | * | 8/1972 | Zerwes et al. ................. | 174/53 |
| 4,102,466 A | | 7/1978 | Jadatz | |
| 4,265,365 A | * | 5/1981 | Boteler ......................... | 174/53 |
| 4,803,307 A | | 2/1989 | Shotey | |
| 4,988,832 A | * | 1/1991 | Shotey ......................... | 174/53 |
| 5,218,169 A | | 6/1993 | Riceman | |
| 5,280,135 A | * | 1/1994 | Berlin et al. ................... | 174/67 |
| 5,317,108 A | | 5/1994 | Prairie, Jr. | |
| 5,362,924 A | * | 11/1994 | Correnti ....................... | 174/67 |
| D378,913 S | | 4/1997 | Chambers et al. | |
| D379,176 S | | 5/1997 | Chambers et al. | |
| D379,970 S | | 6/1997 | Chambers et al. | |
| 5,763,831 A | | 6/1998 | Shotey et al. | |
| 5,773,760 A | | 6/1998 | Stark et al. | |
| D397,995 S | | 9/1998 | Lamar et al. | |
| D411,826 S | | 7/1999 | Lamar et al. | |
| 6,441,307 B1 | | 8/2002 | Shotey et al. | |
| 6,476,321 B1 | * | 11/2002 | Shotey et al. .................. | 174/67 |
| 6,642,453 B2 | | 11/2003 | Shotey et al. | |
| D486,452 S | | 2/2004 | Dinh | |
| 6,723,922 B1 | | 4/2004 | Shotey et al. | |
| 6,770,816 B2 | | 8/2004 | Shotey et al. | |
| 2003/0178218 A1 | | 9/2003 | Shotey et al. | |

* cited by examiner

*Primary Examiner*—Angel R. Estrada
(74) *Attorney, Agent, or Firm*—Galgano & Associates PLLC

(57) ABSTRACT

Weatherproof, while-in-use electrical receptacle cover assemblies include a base with a cover hingedly coupled to the base and one or more adapter plates. The cover hinge is preferably formed by a pair of camming recesses, a pair of mating pins, and a pair of leaf springs. The leaf springs urge the pins into engagement with the camming recesses. The camming recesses guide the pins in a direction perpendicular to the action of the springs. The cover is provided with at least one catch on an edge opposite the hinged coupling to the base and the base is provided with at least one pawl which engages the catch when the cover is closed. The action of the springs and the camming recesses urge the catch into engagement with the pawl which locks the cover closed against unintentional opening.

21 Claims, 5 Drawing Sheets

WEATHERPROOF WHILE-IN-USE ELECTRICAL RECEPTACLE COVER ASSEMBLY

CROSS-REFERENCE TO RELATED APPLICATIONS

This application is a continuation-in-part of co-pending design application Ser. No. 29/228,035 filed Apr. 18, 2005 and U.S. design application Ser. No. 29/228,034 filed Apr. 18, 2005.

BACKGROUND OF THE INVENTION

1. Field of the Invention

This invention relates broadly to protective covers for electrical outlets. More particularly, this invention relates to weatherproof, while-in-use electrical receptacle cover assemblies.

2. State of the Art

The U.S. National Electric Code (NEC) Article 406(b)(1) provides for weatherproof, while-in-use electrical receptacle covers. This type of cover has been available for many years. An early example of such a cover is shown in U.S. Pat. No. 4,803,307 which discloses a weatherproof outlet cover for fitting over an outdoor electric outlet. The cover comprises a mounting plate which is removably secured to the outlet housing in place of a conventional face plate, and a lid member which is removably and pivotably mounted over the mounting plate. At least one access slot is provided in the bottom of the lid member for enabling a corresponding number of electrical cords to be extended therethrough. A first sealing member is disposed between the mounting plate and the wall which surrounds the outlet housing, and a second sealing member is disposed between the lid member and the mounting plate, in order to prevent foreign matter from entering the outlet. Similar covers are shown in U.S. Pat. Nos. 5,317,108; 5,763,831; 6,700,063; and 6,737,576.

While the known cover assemblies appear functional, they lack a certain flexibility and security.

SUMMARY OF THE INVENTION

It is therefore an object of the invention to provide weatherproof, while-in-use electrical receptacle cover assemblies.

It is another object of the invention to provide weatherproof, while-in-use electrical receptacle cover assemblies which are flexible relative to the type of receptacle they are used with.

It is a further object of the invention to provide weatherproof, while-in-use electrical receptacle cover assemblies which close more securely.

It is also an object of the invention to provide weatherproof, while-in-use electrical receptacle cover assemblies which can be locked with a padlock.

It is an additional object of the invention to provide weatherproof, while-in-use electrical receptacle cover assemblies in both vertical and horizontal configurations.

Certain of the foregoing and related objects are readily attained according to the present invention by the provision of a weatherproof, while-in-use, electrical receptacle cover assembly, comprising: a base having a bottom opening securable to a top face of an electrical outlet; and a cover hingeably secured to said base for pivotable and slidable movement between an open and closed position relative to said base, said cover in said closed position thereof being intended to cover an electrical outlet secured to the base, said cover having at least one opening to allow an electrical cord attached to an electrical plug to extend from the cover when the electrical plug is received in the electrical outlet.

Preferably, the electrical receptacle cover assembly additionally includes spring-loaded hinge means for hingedly securing said cover to said base to allow for pivotable and sliding movement of said cover relative to said base. Advantageously, said spring-loaded hinge means comprising an elongated hinge element having a pair of axle-like ends, wherein said hinge element is mounted on one of said cover and said base, and wherein a pair of bearing supports are mounted on the other said cover and base which each pivotably and slidably support an opposite one of said axle-like ends of said hinge element.

Most advantageously, said pair of bearing supports each include an arcuate wall which serves as a camming surface against which said axle-like ends are biased via at least one spring. Most desirably, said spring-loaded hinge means comprise a pair of spaced-apart leaf springs which biasely engage said hinge element to urge each of said axle-like ends thereof against an opposite one of said camming surfaces of said bearing supports.

In a further embodiment according to the invention, a weatherproof, while-in-use electrical receptacle cover assembly, comprises a base having a pair of camming recesses; a cover pivotably coupled to said base for movement between an opened and closed position relative thereto, said cover having a pair of mating pins residing in said recesses; and at least one spring biasing said pins into said camming recesses.

Preferably, said spring includes a pair of leaf springs. Desirably, said camming recesses cause said pins to be biased in a direction orthogonal to the biasing direction of said spring. Most desirably, said cover has a flange and said base has a C-shaped member which is engaged by said flange when said cover is closed.

In a further embodiment, said cover has at least one opening dimensioned to allow an electrical cord to pass through the cover when it is closed. Preferably, said cover and said base are each provided with an eyelet dimensioned to receive a padlock. Most advantageously, the cover assembly further comprises a removable adapter plate having an opening configured to fit a type of electrical outlet and a plurality of screw holes adapted to align with screw holes in an electrical outlet box. Most desirably, said cover has a pair of flanges and said base has a pair of C-shaped members which are engaged by said flanges when said cover is closed and said cover has a pair of openings, each dimensioned to allow an electrical cord to pass through the cover when it is closed.

Certain of the foregoing and related objects are also attained according to the invention by the provision of a kit, comprising an electrical outlet box; an electrical outlet configured to be mounted in said outlet box; a cover gasket configured to fit in said outlet box around said outlet; a cover base configured to fit over said gasket and having a pair of camming recesses; a cover having a pair of mating pins residing in said recesses; and at least one spring biasing said pins into said camming recesses. The kit may also be provided with the preferred optional features as discussed above in connection with the other embodiments of the cover assembly.

In further accord with these objects, which will be discussed in detail below, weatherproof, while-in-use electrical receptacle cover assemblies according to the invention also include a base with a cover hingedly coupled to the base and one or more adapter plates. According to one aspect of the invention, the cover hinge is formed from a pair of camming recesses, a pair of mating pins, and a pair of leaf springs. The leaf springs urge the pins into engagement with the camming recesses. The camming recesses guide the pins in a direction perpendicular to the action of the springs. The cover is provided with at least one external flange on an edge opposite the hinged coupling to the base and the base is provided with at least one C-shaped member which is engaged by the flange when the cover is closed. The action of the springs and the camming recesses urge the flange into engagement with the C-shaped member which locks the cover closed against unintentional opening. The cover and the base are preferably provided with heavy duty eyelets which allow the attachment of a padlock. The cover assembly is attachable to a conventional electrical outlet via the adapter plate. When the cover is closed, the cover and base define a space large enough to contain a male electrical plug which is plugged into the electrical outlet. At least one U-shaped opening is provided in the cover on the same side as the flange and the eyelet. The U-shaped opening is dimensioned to accommodate an electrical cord attached to the electrical plug. According to another aspect of the invention, different adapter plates are provided so that the cover assembly may be used with different electrical outlets, e.g. GFI outlets and standard duplex outlets.

Additional objects and advantages of the invention will become apparent to those skilled in the art upon reference to the detailed description taken in conjunction with the provided figures.

DETAILED DESCRIPTION OF THE PREFERRED AND ILLUSTRATED EMBODIMENTS

Figure 1:
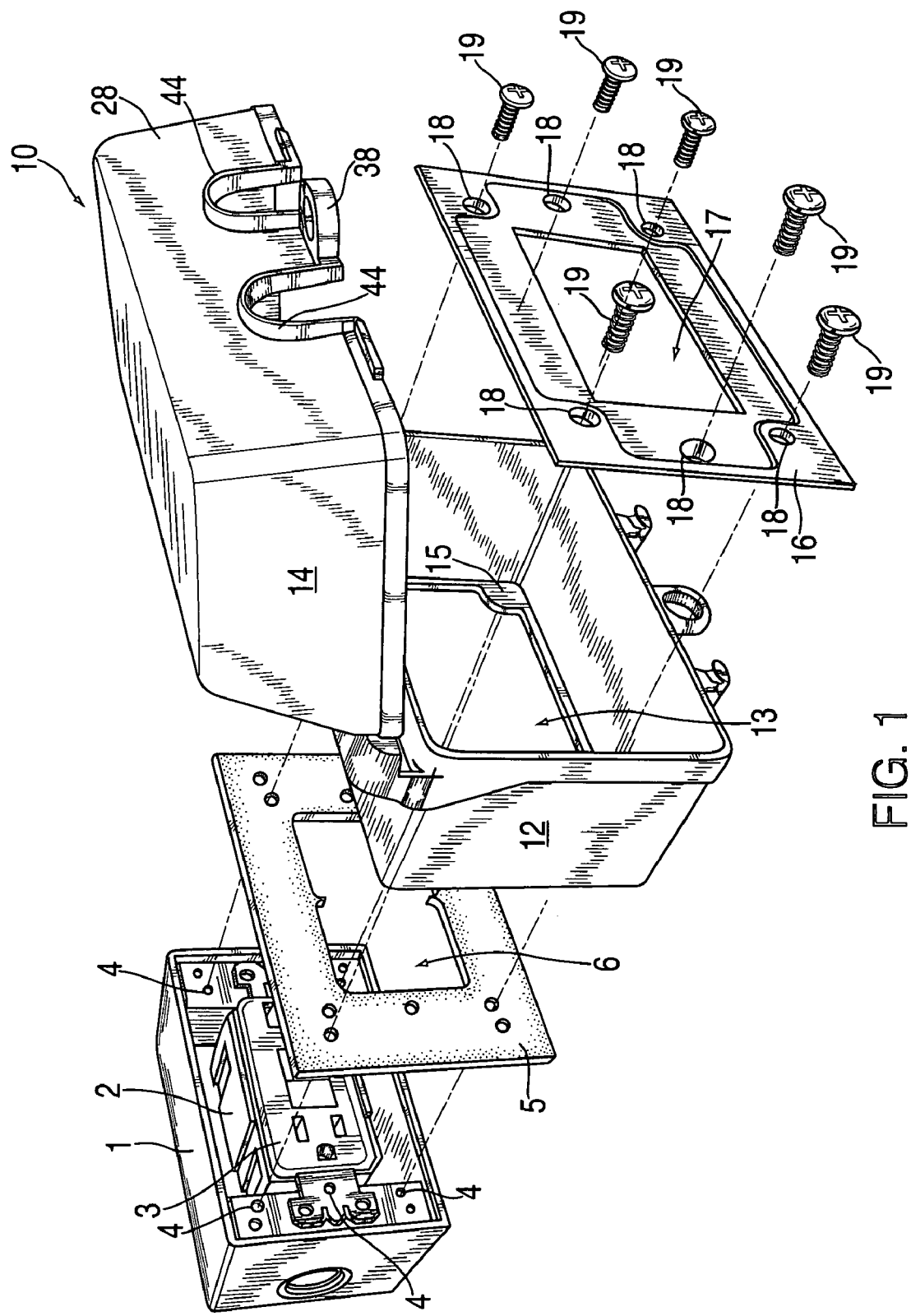
FIG. 1 is an exploded, perspective view of an electrical receptacle cover assembly according to the invention, shown together in combination with an electrical receptacle box.

Turning now to FIG. 1, a weatherproof, while-in-use electrical receptacle cover assembly 10 according to the invention is shown which includes a preferably, generally rectangular base 12 with a mating, preferably rectangular, box-shaped cover 14 hingedly coupled to the base 12 and one or more adapter plates 16 (only one of which is shown). The assembly 10 is designed to be attached via outlet gasket 5 to a conventional electrical receptacle, junction or outlet box 1 containing an electrical outlet 2 but without its cover (not shown). The adapter plate 16 includes an outlet opening 17 and a plurality of screw holes 18. The outlet opening 17 is dimensioned and configured to match the outline of the top face 3 of outlet 2, in this case, a rectangular GFI outlet. Similarly, outlet gasket 5 is provided with an outlet opening 6 which is also configured to match the outline of top face 3 of outlet 2. According to the invention, multiple adapter plates 16 (and if need be, outlet gasket 5) are made available for different types and/or configurations of electrical outlets.

The base 12 has a large bottom opening 13 which is dimensioned to accommodate the largest electrical outlet intended for use with box 1. The opening 13 is preferably surrounded by four corner flanges 15 (only one of which can be seen in FIG. 1) which are intended to butt against and support the adapter plate 16. The adapter plate 16 is preferably provided with a peel and stick backing adhesive (not shown) which holds it in place before screws 19 are used to secure it to the outlet box 1. Similarly, the gasket 5 is provided with a peel and stick backing (not shown).

To assemble the cover assembly 10 to the electrical box 1, the peel off paper (not shown) is removed from the adapter plate 16 revealing the adhesive (not shown) and the adapter plate 16 is placed inside the base 12 adjacent the opening 13, supported by the corner flanges 24 to which it sticks. The peel off paper (not shown) is also removed from the gasket 5 revealing adhesive which is used to adhere the gasket 5 to the box 1. The cover assembly 10 is aligned over the gasket 5 and the screws 19 are inserted through the holes 18 in the adapter plate 16 and into threaded holes 4 in the outlet box 1.

Figure 2:
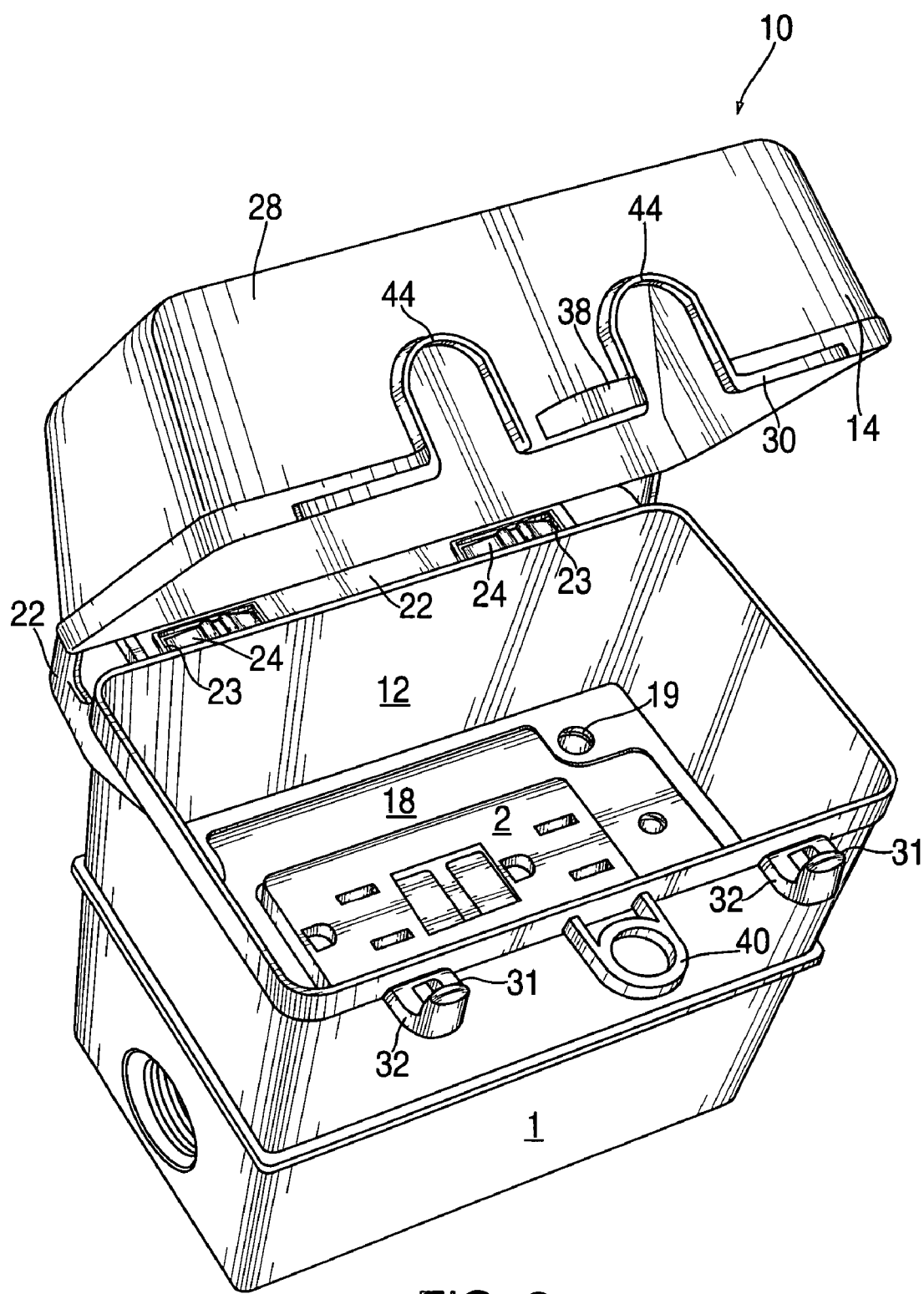
FIG. 2 is a perspective view of the cover assembly and electrical box fully assembled with the cover open.
Figure 6:
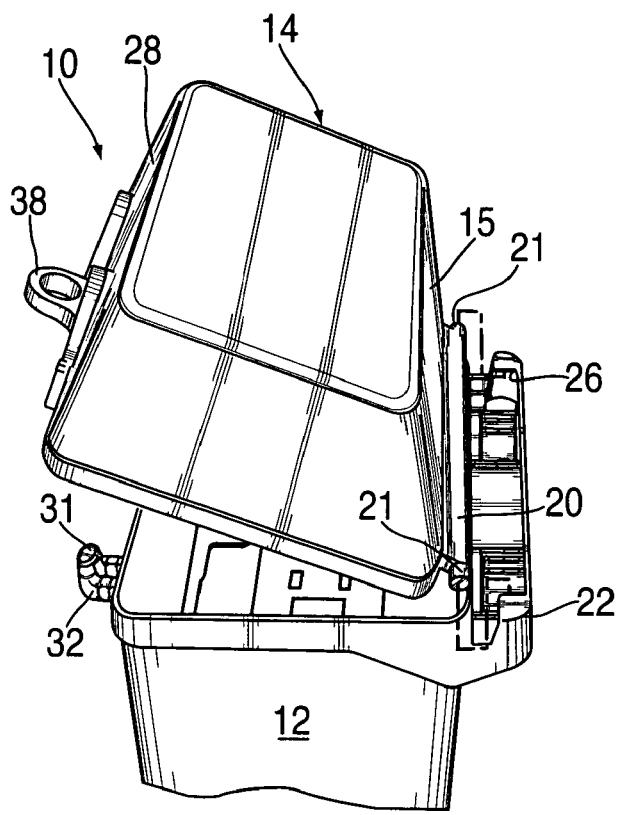
FIG. 6 is an exploded, perspective view of the electrical cover assembly showing how the hinge element of the cover is positioned in the bearing support of the base.

As seen best in FIG. 6, cover 14 has a sloping rear wall 15, the free edge of which closest to base 12 is provided with an elongated, generally cylindrical, somewhat T-shaped hinge element 20. T-shaped hinge element 20 has a pair of generally short, laterally outwardly extending end projections, pins or axles 21. As seen best in FIGS. 2 and 4a, the upper edge of the rear of the base 12 is provided with an elongated, laterally-extending flange or ledge 22 having two spaced apart, generally rectangular wells 23 in the top surface thereof in which each of which is mounted an inverted, somewhat W-shaped, and upwardly biasing leaf spring 24. As seen best in FIGS. 3 and 4, the lateral ends of ledge 22 are each provided with an upstanding generally inverted L-shaped bearing support 25, each of which define a socket for pivotable and sliding support of one of the pins 21.

Figure 4:
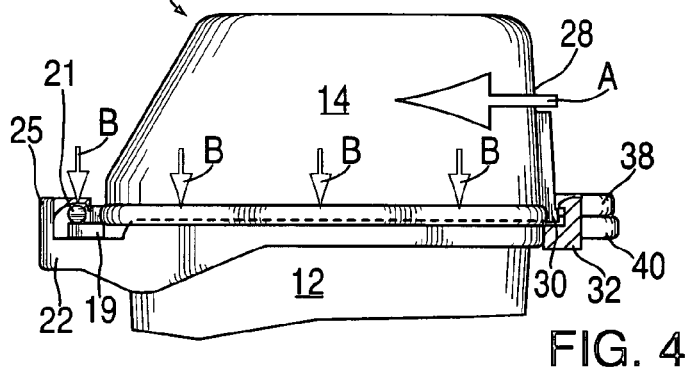
FIG. 4 is a view similar to FIG. 3 showing the cover in the first stage of opening.

As seen best in FIG. 4, the elongated, generally cylindrical hinge element 20 is normally received between the leaf springs 24 and an upper arcuate or curved camming surface 26 of the socket of bearing support 25 with the leaf springs 24 serving to upwardly bias the hinge element 20 which, in turn, upwardly biases pins 21 against the camming surfaces 26.

As a result, the cover 14 is pivotably mounted on base 12 for movement between an open and closed position via its spring-loaded hinge assembly, i.e., the cooperative co-action of the pair of camming surfaces 26, acting on the pair of pins or axles 21, and the pair of leaf springs 24 acting on the main cylindrical hinge element 20, which, in turn, urges the pins 21 upwardly against the camming surfaces 26. Put somewhat differently, the leaf springs 24 urge, via hinge element 20, the pins 21 into engagement with the camming recesses 26. The arcuate camming recesses 26 urge the pins 21 and, in turn, the cover 14 upwardly, as well as towards the front of the cover assembly 10 and generally in a direction opposite to that of the large arrow A shown in FIG. 4.

Figure 3:
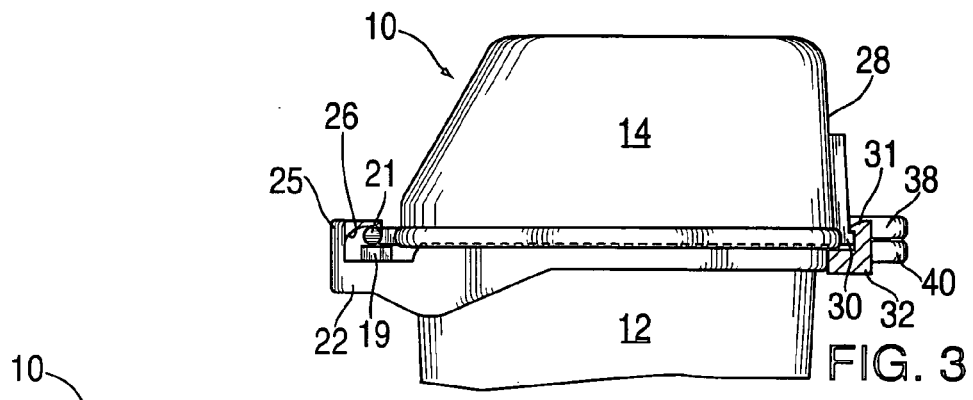
FIG. 3 is a broken, side elevational view, in part section, of the cover assembly with the cover closed.
Figure 4A:
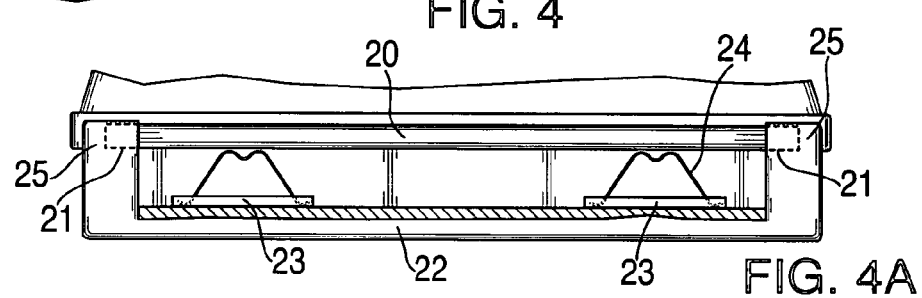
FIG. 4A is a broken side elevational view, in part section, of the hinge portion of the cover assembly.
Figure 5:
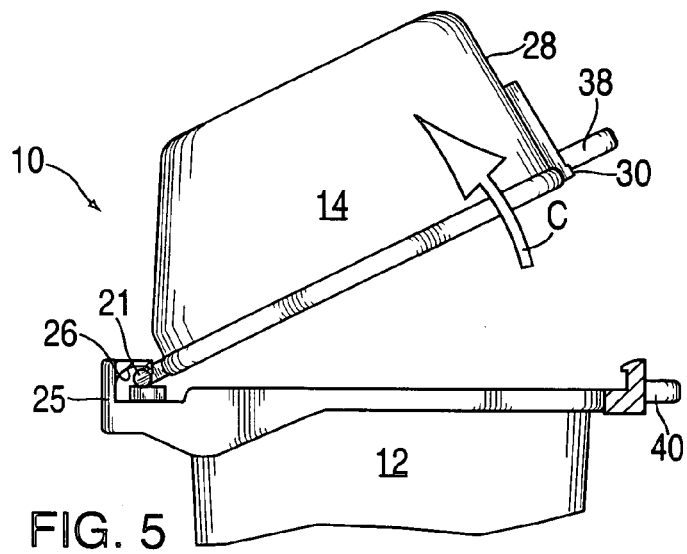
FIG. 5 is a view similar to FIGS. 3 and 4, but with the cover partially opened.

As seen best in FIGS. 3-5, the front wall 28 of the cover 14 is provided with at least one and preferably two spaced-apart forwardly projecting lip or catches 30, and the upper rim of base 12 is provided with at least one and preferably two generally L-shaped locking members 32, each of which has an upper free end with an inwardly directed lip which forms a generally L-shaped pawl 31 to cooperatively define a generally c-shaped member which engages one of the catches 30 when the cover 14 is closed as shown in FIG. 3. It should be noted that the phantom line in FIG. 3 represents the upper rim of base 12 and it shows that the rim of cover 14 overlaps and surrounds the upper rim of base 12 when it is closed to provide a generally water-tight seal. The action of the springs 24 and the camming recesses 26 urge the cover catches 30 to engage the L-shaped pawls 31 which locks the cover 14 in the closed position so as to minimize unintentional opening.

In order to open cover 14, it must be pressed, relative to base 12, in the direction of the arrows A and B shown in FIG. 4. This causes the pins 21 to ride in the camming recesses 26 in the direction of arrow A such that the cover 14 is also urged downward or depressed in the direction of arrows B; the downward movement of cover 14 can be seen by comparing the position of the upper rim of base 12 (shown in phantom line) in FIGS. 3 and 4. It will be appreciated that the process of opening the cover 14 can be facilitated if the user presses cover 14 in the direction of both arrows A and B simultaneously. When the cover 14 is slid rearwardly in the direction of arrow A, catches 30 will cease to engage pawls 31 and the cover 14 can then be lifted and pivoted in the direction of arrow C shown in FIG. 5.

Figure 6A:
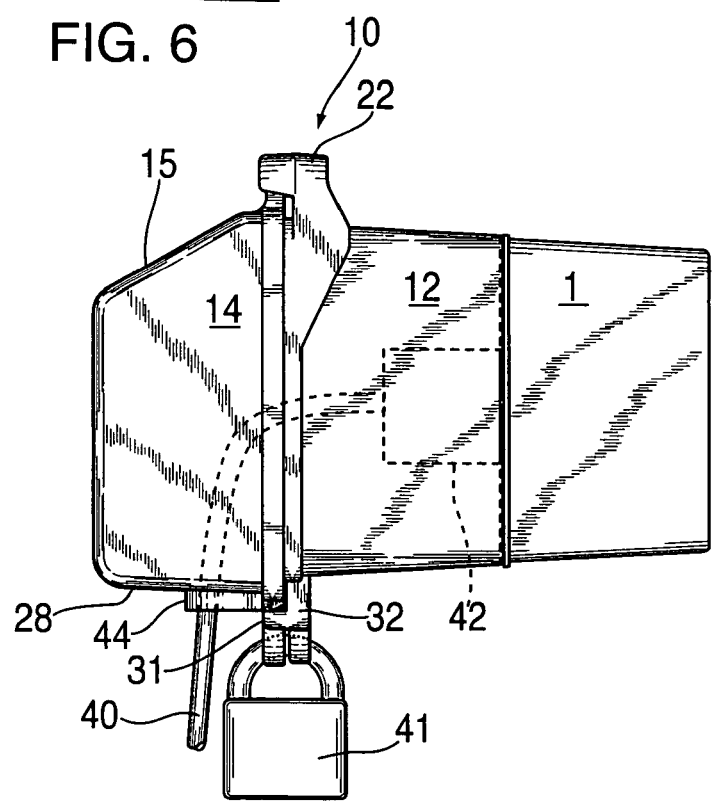
FIG. 6A is a side elevational view of the cover assembly and electrical receptacle box fully assembled with the cover in a closed position and showing an electrical cord in use with its plug, in phantom line, received in the electrical receptacle while covered by the cover assembly.

The cover 14 and the base 12 are preferably provided with heavy duty eyelets 38, 40 respectively, which allow the attachment of a fairly large and substantial padlock 41 for security purposes. The cover 14 and base 12 define a space large enough to accommodate at least one electrical cord 40 having a male electrical plug 42 which is plugged into the electrical outlet 2 (see FIG. 6A). At least one and preferably two inverted, generally U-shaped openings 44 are provided in the front wall 28 of cover 14 on opposite sides of the eyelet 38. The U-shaped openings 42 are dimensioned to accommodate the pass-through of, electrical cord 40 attached to the electrical plug 42 which is plugged into the outlet 2, thereby allowing the same to be used while the cover 14 protects the plug 42 in a weather-proof manner. The slope of the cover rear wall 15 in the closed position as shown in FIG. 6A serves to facilitate the drainage of rain away from the cover assembly.

FIG. 6 illustrates, via phantom line, how the cover 14 is mounted on the base 12. It will be appreciated that the pins 21 easily snap into the socket of bearing support 25 such that they ride upon camming surfaces 26 via the biasing action of springs 24.

Figure 7:
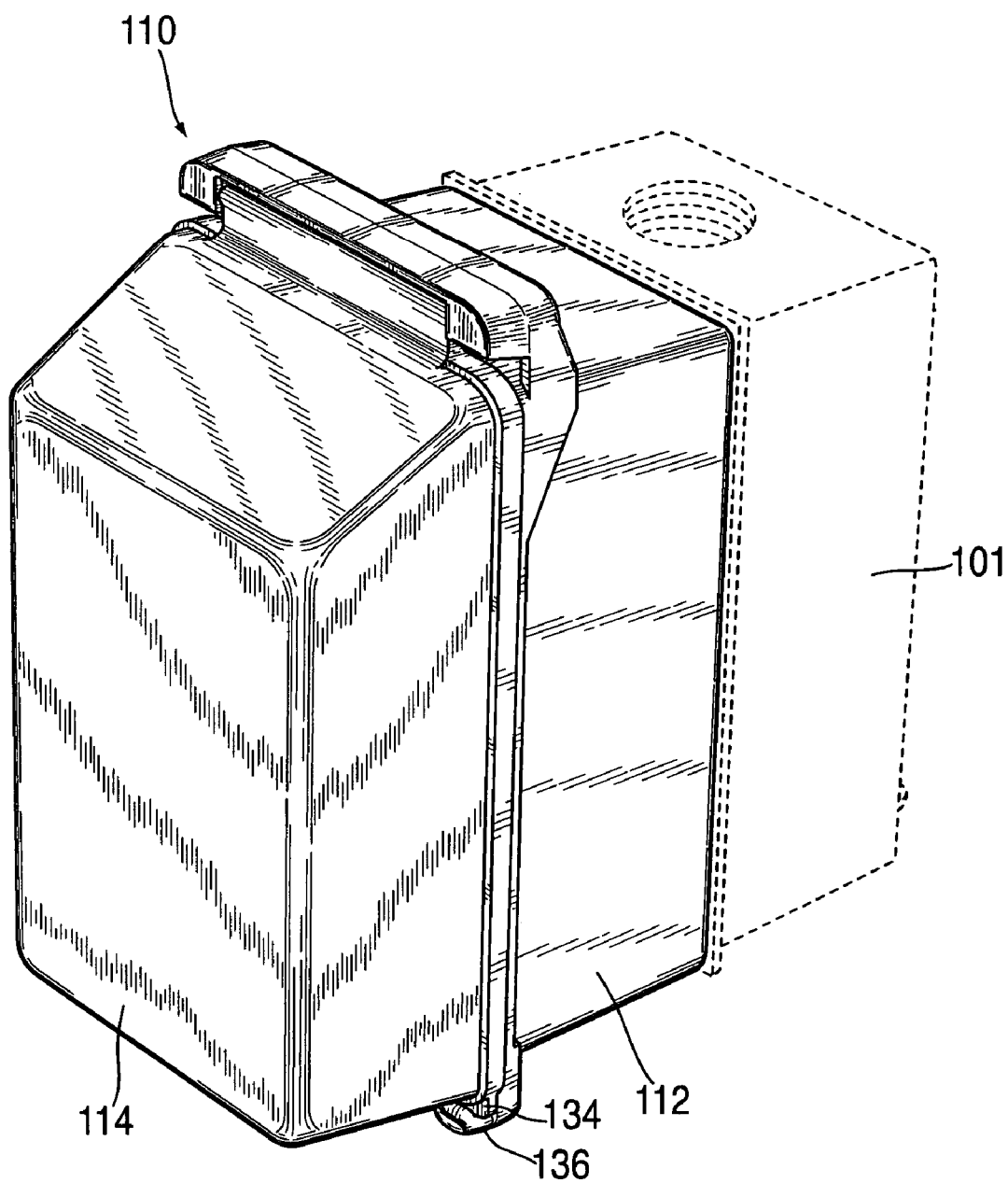
FIG. 7 is a perspective view of another embodiment of the invention, showing the same mounted in a vertical fashion on an electrical receptacle box shown in phantom line.

Those skilled in the art will appreciate that some outlet boxes are mounted vertically. FIG. 7 shows a second embodiment of a cover assembly 110 where similar reference numerals (increased by 100) refer to similar parts. FIG. 7 illustrates the cover assembly 110 closed and attached to a vertically mounted outlet box 101; see also Applicant's U.S. design applications Ser. Nos. 29/228,034 and 29/228,035, the subject matter of which is incorporated herein by reference thereto.

There have been described and illustrated herein several embodiments of a weatherproof, while-in-use electrical receptacle cover assembly. While particular embodiments of the invention have been described, it is not intended that the invention be limited thereto, as it is intended that the invention be as broad in scope as the art will allow and that the specification be read likewise. For example, although the cover assembly is preferably made from a corrosion-resistant cast metal, other materials may be substituted as local electrical codes permit. In addition, other cover configurations are, of course, possible to suit different applications. It will therefore be appreciated by those skilled in the art that yet other modifications could be made to the provided invention without deviating from its spirit and scope as claimed.

The invention claimed is:

1. A weatherproof, while-in-use; electrical receptacle cover assembly for an outdoor electrical outlet, comprising:

a generally rectangular base having a front wall, a rear wall and two side walls interconnecting said front and rear walls which cooperatively define a top opening and a bottom opening, the latter of which is securable adjacent to a top face of an outdoor electrical outlet, said walls each having an upper edge;

a cover hingeably secured to said base generally adjacent to said upper edge of said rear wall of said base for pivotable and slidable movement between an open and closed position relative to said base, said cover in said closed position thereof being intended to cover an electrical outlet secured to the base, said cover having at least one opening to allow an electrical cord attached to an electrical plug to extend from the cover when the electrical plug is received in the electrical outlet and said cover is in said closed position; and spring-loaded hinge means for hingedly securing said cover to said base to allow for pivotable movement of said cover about an axis generally co-axially aligned with said upper edge of said rear wall and for reciprocable sliding movement of said cover when in said closed position relative to said base in a direction generally toward and away from, said upper edges of said front and rear walls, said spring-loaded hinge means normally biasing said cover in a direction towards said upper edge of said front wall.

2. An electrical receptacle cover assembly according to claim 1, wherein said spring-loaded hinge means comprising an elongated hinge element having a pair of axle-like ends, wherein said hinge element is mounted on one of said cover and said base, and wherein a pair of bearing supports are mounted on the other said cover and base which each pivotably and slidably support an opposite one of said axle-like ends of said hinge element.

3. An electrical receptacle cover assembly according to claim 2, wherein said pair of bearing supports, each include an arcuate wall which serves as a camming surface against which said axle-like ends are biased via at least one spring.

4. An electrical receptacle cover assembly according to claim 3, wherein said spring-loaded hinge means comprise a pair of spaced-apart leaf springs which biasely engage said hinge element to urge each of said axle-like ends thereof against an opposite one of said camming surfaces of said bearing supports.

5. An electrical receptacle cover assembly, according to claim 1, wherein:

said base has a pair of camming recesses; said cover has a pair of mating pins residing in said recesses; and at least one spring biases said pins into said camming recesses.

6. A cover assembly according to claim 5, wherein:
said spring includes a pair of leaf springs.

7. A cover assembly according to claim 5, wherein:
said camming recesses cause said pins to be biased in a direction orthogonal to the biasing direction of said spring.

8. A cover assembly according to claim 1, wherein:
said cover has a flange and said base has a C-shaped member which is engaged by said flange when said cover is closed.

9. A cover assembly according to claim 1, wherein:
said cover and said base are each provided with an eyelet dimensioned to receive a padlock.

10. A cover assembly according to claim 1, further comprising:
a removable adapter plate having an opening configured to fit a type of electrical outlet and a plurality of screw holes adapted to align with screw holes in an electrical outlet box.

11. A cover assembly according to claim 1, wherein:
said cover has a pair of flanges and said base has a pair of C-shaped members which are engaged by said flanges when said cover is closed.

12. A cover assembly according to claim 1, wherein:
said cover has a pair of openings, each dimensioned to allow an electrical cord to pass through the cover when it is closed.

13. A kit, comprising:
an electrical outlet box having a top face with an opening therein;
an electrical outlet configured to be mounted in said outlet box such that it is disposed generally adjacent to said top face;
a cover gasket configured to fit in said outlet box adjacent to said top face around said outlet;
a base configured to fit over said gasket and being positionable adjacent to said top face of said electrical outlet box, said base having a bottom opening; and
a cover hingeably securable to said base for pivotable and slidable movement between an open and closed position relative to said base, said cover in said closed position thereof being intended to cover said electrical outlet, said cover having at least one opening to allow an electrical cord attached to an electrical plug to extend from the cover when the electrical plug is received in the electrical outlet.

14. A kit according to claim 13, wherein:
said base has a pair of camming recesses and said over has a pair of matching pins residing in said recesses and a pair of leaf springs biasing said pins into said camming recesses.

15. A kit according to claim 13, wherein:
said camming recesses cause said pins to be biased in a direction orthogonal to the biasing direction of said spring.

16. A kit according to claim 13, wherein:
said cover has a flange and said base has a C-shaped member which is engaged by said flange when said cover is closed.

17. A kit according to claim 13, wherein:
said cover has at least one opening dimensioned to allow an electrical cord to pass through the cover when it is closed.

18. A kit according to claim 13, wherein:
said cover and said base are each provided with an eyelet dimensioned to receive a padlock.

19. A kit according to claim 13, wherein:
a removable adapter plate having an opening configured to fit the electrical outlet and a plurality of screw holes adapted to align with screw holes in the electrical outlet box.

20. A kit according to claim 13, wherein:
said cover has a pair of flanges and said base has a pair of C-shaped members which are engaged by said flanges when said cover is closed.

21. A kit according to claim 13, wherein:
said cover has a pair of openings, each dimensioned to allow an electrical cord to pass through the cover when it is closed.

* * * * *